United States Patent [19]

Schützer

[11] 4,321,944
[45] Mar. 30, 1982

[54] CHECK VALVE

[75] Inventor: Gerhard Schützer, Stuhr, Fed. Rep. of Germany

[73] Assignee: Gustav F. Gerdts KG, Bremen, Fed. Rep. of Germany

[21] Appl. No.: 196,417

[22] Filed: Oct. 14, 1980

[30] Foreign Application Priority Data

Oct. 13, 1979 [DE] Fed. Rep. of Germany ... 7929136[U]

[51] Int. Cl.³ .............................................. F16K 15/03
[52] U.S. Cl. ................................................. 137/512.1
[58] Field of Search ................ 137/512, 512.1, 512.15; 73/861.76

[56] References Cited

U.S. PATENT DOCUMENTS

| Re. 30,532 | 3/1981 | Buckner | 137/512.1 |
| 303,702 | 8/1884 | Carricaburu | 137/512 X |
| 3,384,112 | 5/1968 | Smith | 137/512.1 |
| 3,910,114 | 10/1975 | Rosean | 73/861.76 |
| 4,209,037 | 6/1980 | Upham | 137/512 |

Primary Examiner—Robert G. Nilson
Attorney, Agent, or Firm—Allison C. Collard; Thomas M. Galgano

[57] ABSTRACT

A check valve with a valve seat formed in the valve housing wherein two side-by-side locking members are pivotably mounted in the valve seat for movement between an open and closed position. The locking members have their pivoting edges mounted adjacent and parallel to each other in the housing and have bearing bushings formed along the adjacent edges which engage side-by-side shafts whose ends are engaged to the valve housing. A pair of locking springs each have their windings engaged to one of the shafts which are located between the bearing bushings. Each of said springs has a first shank portion which is rigidly supported by an abutment of the valve housing and a second shank portion which engages the locking member mounted on the same shaft of the corresponding spring to urge the same into a closed position relative to the valve seat.

1 Claim, 2 Drawing Figures

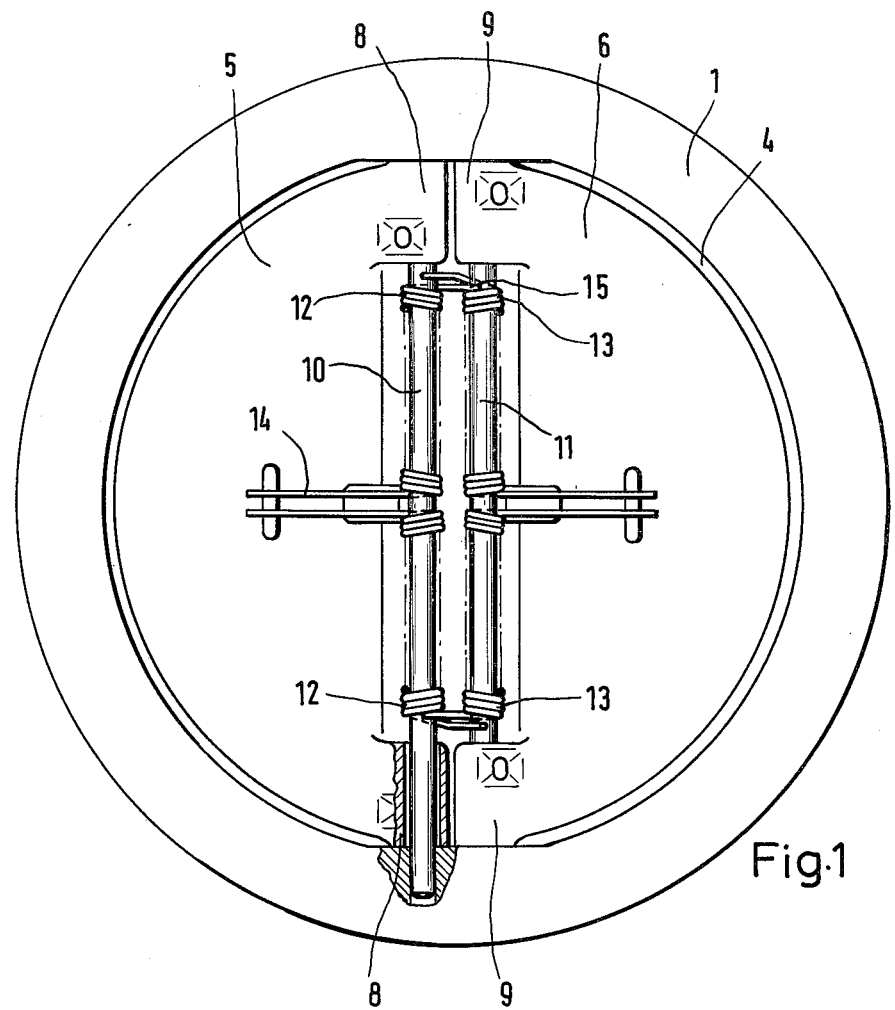
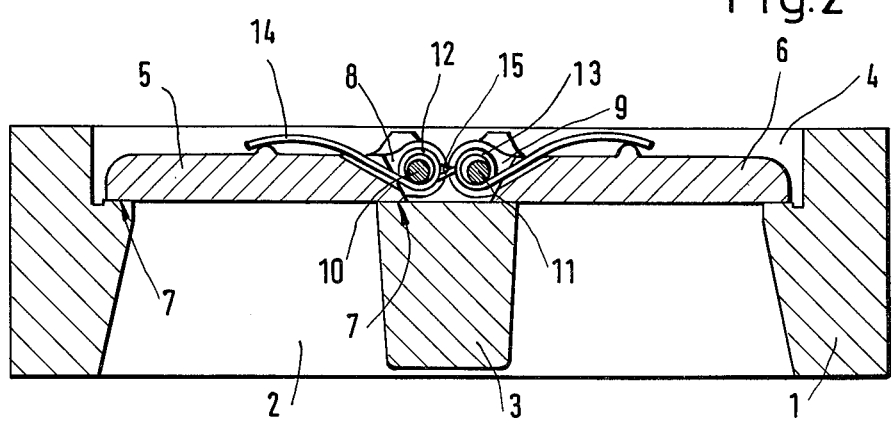

CHECK VALVE

The invention relates to a check valve of the type having a valve housing which defines a valve seat and two spring-loaded locking members which are pivotably mounted in the valve housing along adjacent opposed edges thereof for cooperation with the valve seat and which are biased by the spring-loading into locking engagement with the valve seat.

It is an object of the invention to provide a check valve having a particularly short construction length and which is characterized by a favorable opening and closing behavior and also by a simple structure which can be easily manufactured.

This object of the invention is realized by the provision of a check valve of the aforementioned type wherein the check valve has two spring-loaded locking members whereby the springs are loaded in the locking position and are pivotably mounted at their facing edges in the valve housing. The spring-loaded locking parts cooperate with a valve seat in the valve housing, so that both locking parts are provided with bearing bushings at their facing edges in immediate proximity of the valve seat. Two pivot axes are provided in a side-by-side arrangement in the valve housing, so that a locking part with associated bearing bushings are mounted on each pivot axis. There are two shank springs with their windings mounted between the bearing bushings, so that the shank springs are effective on the corresponding locking parts mounted on the pivot axis, while the other spring shank is supported on the housing.

Due to positioning two pivot axes in the immediate proximity of the valve seat, the housing length for accommodating the two locking parts and their associated bearings is particularly short. Therefore, the total length of the housing can be very short. The independent mounting of the two locking parts prevents the weight of one of the locking parts to come to rest on the bearing of the other locking part, in particular, with a perpendicular pivot axis, as is the case when installing the check valve into a horizontal pipe line. In this manner, friction forces which hamper the pivot movement are eliminated. The arrangement of shank springs for each locking member is advantageous since the shank deflection of the shank springs during opening is only half of that of a conventional type spring which operates both locking members, so that a corresponding increase of the locking movement for the shank springs is also reduced. Furthermore, by employing plural pivot axes, in contrast to a single axis, the available installation length for the springs, is considerably enlarged. Thereby, a particularly large number of windings can be provided, and consequently a very flat spring characteristic can be realized. The meeting of these criterias results in a specifically favorable opening and closing behavior of the check valve which is also characterized by using only a few individual parts which can be easily made and assembled.

There is also a very good accessibility of the spring shanks which are supported on the housing. This facilitates the use of an assembly tool for pretensioning the shank springs during assembly and/or disassembly.

Other objects and features of the present invention will become apparent from the following detailed description when taken in connection with the accompanying drawing which discloses one embodiment of the invention. It is to be understood that the drawing is designed for the purpose of illustration only, and is not intended as a definition of the limits of the invention.

In the drawing, wherein similar reference characters denote similar elements throughout the several views:

FIG. 1 is a plan view of the downstream side of a check valve embodying the present invention, with a portion broken away to show internal construction; and FIG. 2 is a cross-sectional view of the check valve shown in FIG. 1.

Referring now in detail to FIGS. 1 and 2, a flat disklike valve housing 1 is provided with a transverse rib 3 disposed in an upstream inner chamber 2. In a downstream inner chamber 4, two side-by-side locking members 5, 6 are mounted so as to cooperate with a valve seat 7 in valve housing 1.

Two bearing bushings 8, 9 are mounted on the edges of two locking members 5, 6 facing each other and are positioned with their outside surfaces adjacent to valve housing 1. These bushings are provided immediately above valve seat 7 in the range of transverse rib 3. Two parallel pivot shafts 10, 11 are arranged side-by-side with their ends engaged in valve housing 1. The bearing bushings 8 or 9 of each locking member 5 or 6 pivot on shafts 10 or 11. With their long spring shanks 14, each of shank springs 12 or 13, respectively, act on locking parts 5, 6 mounted on the same pivot axes 10, 11 in locking direction. The short spring shank 15 is supported on pivot axis 10 or 11, respectively, of the other locking part 5, 6, and is thereby easily accessible for assembly and/or disassembly.

The separate mounting of the two locking parts 5, 6 closely adjacent to valve seat 7, permits a short housing length. At the same time, the arrangement of the two pivot shafts 10, 11 has the advantage that two locking members 5, 6 with a perpendicular rotating axis (FIG. 1) are supported with their associated bearing bushings 8, 9 on valve housing 1, so that the weight of one of the locking parts does not rest on the other, which would result in high friction forces during the opening and closing of check valve 1.

In view of the fact that pivot shafts 10, 11 also serve to mount shank springs 12, 13 and are also the housing side abutments for shank springs 12, 13, additional construction parts for this purpose are not required.

Since each shank spring 12, 13 exclusively acts on one of the locking members 5, 6, the tension angle of shank springs 12, 13 are relatively low during opening. In view of the relatively large spring installation space on both sides of pivot axes 10, 11 between bearing bushings 8, 9, shank springs 12, 13 have a particularly flat spring characteristic, so that during opening, only a very low increase of the locking movement is exerted by shank springs 12, 13, which are mounted on the downstream side, onto locking parts 5, 6. Even with low amounts of flow, a complete opening of check valve 1 is achieved, reducing a pressure loss by the flow medium to a minimum.

Thus, while only one embodiment of the present invention has been shown and described, it will be obvious that many changes and modifications may be made thereunto, without departing from the spirit and scope of the invention.

What is claimed is:

1. A check valve comprising:
    a valve housing having a valve seat defined therein, on one side of which is a flow inlet chamber and on the other side of which is a flow discharge chamber;

two side-by-side locking members pivotably mounted in said valve housing for movement between an open and closed position relative to said valve seat, said locking member having their pivoting edges mounted adjacent and parallel to each other in said housing;

bearing bushings formed in the pivoting adjacent edges of each locking member;

a pair of side-by-side shafts pivotably engaging the bushings of said locking members and having their ends engaged in said valve housing; and at least two shank springs, each of which has two shanks joined by a plurality of windings, one spring of which with its associated windings is mounted on one of said shafts, and the other spring of which with its associated windings is mounted on the other of said shafts, with one of said two shanks of each spring engaging the locking member coupled to the same shaft as the corresponding spring, so as to urge said locking member into a closed position and the other of the two shanks of each spring being supported on an abutment in said housing, said abutment for each of said other shanks of each spring being provided by the shaft on which the other spring is mounted.

* * * * *